Jan. 26, 1943.    H. BANY    2,309,493
REGULATING SYSTEM
Filed Jan. 7, 1942

Inventor:
Herman Bany,
by Harry E. Dunham
His Attorney.

Patented Jan. 26, 1943

2,309,493

UNITED STATES PATENT OFFICE 2,309,493

REGULATING SYSTEM

Herman Bany, Lansdowne, Pa., assignor to General Electric Company, a corporation of New York Application January 7, 1942, Serial No. 425,915

5 Claims. (Cl. 172—238)

My invention relates to regulating systems and particularly to systems for regulating the volt-amperes flowing through the armature winding of a synchronous machine, such as a synchronous generator.

When a synchronous machine is used for voltage or power factor regulation of an electric circuit, it is sometimes desirable to operate the machine at its maximum volt-ampere capacity as long as possible without overheating the machine, and one object of my invention is to provide an improved arrangement of apparatus for accomplishing this result.

In accordance with my invention, I provide an arrangement for regulating the excitation of the synchronous machine in response to the power factor of the machine and the armature current of the machine so as to maintain the power factor within a predetermined range or the armature current at a predetermined value as long as the field current is below a predetermined value beyond which the field current cannot be increased.

Figure 1:
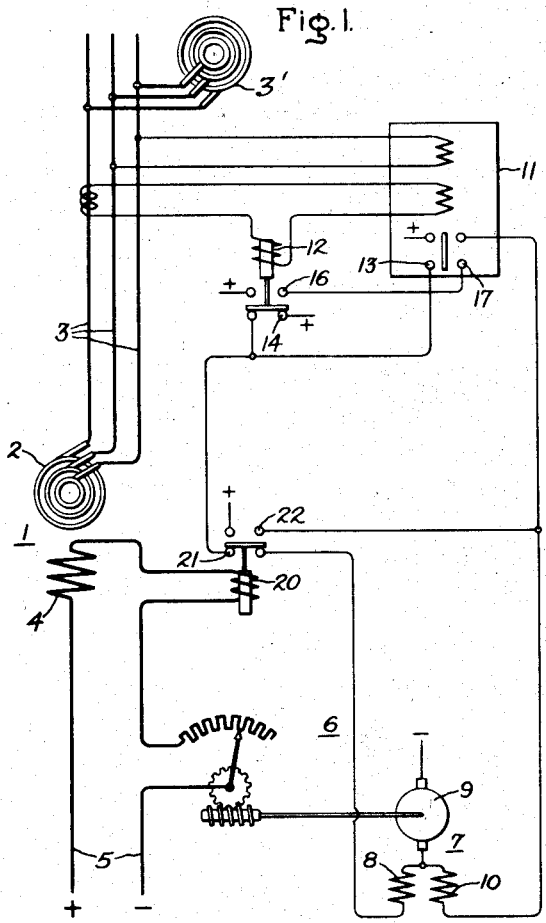
Figure 2:
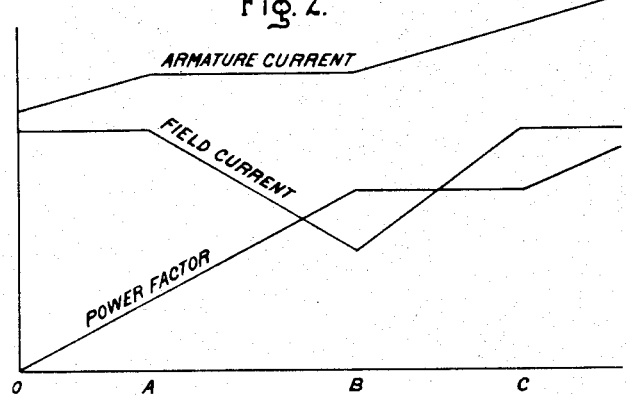

My invention will be better understood from the following description when taken in connection with the accompanying drawing, Fig. 1 of which diagrammatically illustrates a synchronous generator regulating system embodying my invention, and Fig. 2 of which illustrates how my improved regulating arrangement controls the armature and field currents and the power factor of a generator, and the scope of my invention will be pointed out in the appended claims.

Referring to Fig. 1 of the drawing, I represents a synchronous generator having an armature winding 2 connected to an alternating current circuit 3 having another synchronous machine 3' connected thereto and having a field winding 4 connected to a suitable source of excitation 5. The excitation of the field winding 4 is arranged to be varied by means of a motor-operated rheostat 6, the motor 7 of which has a field winding 8 which, when energized in series with the armature winding 9 of the motor, causes the motor to rotate in a direction to adjust the rheostat 6 so as to increase the excitation of the synchronous machine I and a field winding 10 which, when energized in series with the armature winding 9, causes the motor to rotate in a direction to adjust the rheostat 6 so as to decrease the excitation of the machine I. The motor-operated rheostat 6 is normally controlled by means of a power factor relay II and an armature current relay I2, which are respectively connected to the armature circuit of the machine I so that a circuit is completed for the field winding 8 and the armature winding 9 of the motor 7 when either the power factor of the motor is outside a predetermined range so that the contacts I3 of the power factor relay II are closed or the armature current is below a predetermined value so that the contacts I4 of the current relay I2 are closed. The power factor relay II is so connected and arranged that an increase in the excitation of the machine I tends to change the power factor of the machine so that it is outside the range which causes the relay to close its contacts I3. When the current output of the machine I exceeds a predetermined value so that the contacts I6 of the current relay I2 are closed and, at the same time, the power factor of the machine is such that the contacts I7 of the power factor relay are closed, a circuit is completed for the field winding I0 and the armature winding 9 of the motor 7 so that the motor-operated rheostat 6 is operated in a direction to decrease the excitation of the machine I.

In order to protect the machine I against overheating due to the field winding 4 being overexcited, an overcurrent relay 20 is provided in the circuit of the field winding 4 and is arranged to open its contacts 21 and close its contacts 22 whenever the field current exceeds a predetermined value. The opening of the contacts 21 of the relay 20 interrupts the circuit through the field winding 8 of the motor 7 so as to render the current relay I2 and the power factor relay II inoperative to effect an increase in the excitation of the machine I. The closing of the contacts 22 of the field relay 20 completes an energizing circuit for the field winding I0 and the armature winding 9 of the motor 7 so as to decrease the excitation of the machine I.

The operation of the arrangement shown in the drawing is as follows: Whenever the power factor of the machine I is such as to cause the power factor relay II to close its contacts I3 or the generator current output is below the setting of the current relay I2 so that the contacts I4 thereof are closed, an energizing circuit is completed for the motor 7 through the contacts 21 of the field relay 20 so that the motor-operated rheostat 6 is adjusted to increase the field excitation of the generator I. When, however, the power factor of the machine is such that the contacts I7 of the power factor relay II are closed at the same time the generator current ouput is such that the contacts I6 of the current relay 12 are closed, an energizing circuit is completed for the motor 7 so that the motor-operated rheostat 6 is adjusted in a manner to decrease the excitation of the generator 1. Therefore, the current relay 12 operates to maintain the volt-amperes constant until the generator becomes overloaded or the voltage of the alternating current system is reduced. Then, the power factor relay 11 operates to control the motor-operated rheostat 6 so as to maintain the power factor of the machine at a predetermined value.

In case the load on the machine decreases to such a value that the current relay 12 causes the excitation of the generator 1 to increase above its safe operating value, the field relay 20 opens its contacts 21 and closes its contacts 22. The opening of the contacts 21 prevents the rheostat 6 from being adjusted in response to the operation of either the relay 11 or 12 so as to effect a further increase in the field excitation of the machine 1. The closing of the contacts 22 of the field relay 20 causes the field rheostat 6 to be adjusted so as to prevent the generator field current from exceeding the predetermined value at which the relay 20 picks up.

Fig. 2 shows more clearly how my improved regulating arrangement controls the armature and field currents and the power factor of the generator 1 under different load conditions. The section OA covers that part of the operation when the generator is lightly loaded and it is necessary to limit the field excitation in order to prevent overheating. During this part of the operation, the field current relay 20 causes the regulator 6 to maintain the field current at a constant value while the armature current increases, and the power factor becomes less lagging as the load increases. When the load increases above the value A, the armature current relay 12 assumes control of the regulator 6 so that it maintains the armature current and, consequently, the volt-amperes of the generator 1 constant while the field current decreases, and the power factor becomes less lagging as the load increases. When the output of the generator increases above the predetermined value B, the power factor relay 11 assumes control of the regulator 6 so that it maintains the power factor at a constant value while the armature and field currents increase as the load increases until the load reaches the predetermined value C when the field current relay 20 again assumes control of the regulator 6 so as to limit the generator field current to a predetermined value.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous machine, means responsive to the power factor and magnitude of the armature current of said machine for regulating the excitation of said machine to maintain the power factor at a predetermined value while the armature current is above a predetermined value and to maintain the armature current at said predetermined value when the power factor differs from said predetermined value in a predetermined manner, and means energized in accordance with the magnitude of the exciting current of said machine for rendering said regulating means inoperative to increase the exciting current above a predetermined value.

2. In combination, a synchronous machine, means for regulating the excitation of said machine in response to the power factor and the magnitude of the armature current of said machine so as to increase the excitation of said machine when said armature current is below a predetermined value and also when said power factor is within a predetermined range and to decrease the excitation of said machine only when said armature current is above a predetermined value at the same time said power factor is outside said predetermined range, and means energized in accordance with the magnitude of the exciting current of said machine for rendering said regulating means inoperative to increase the exciting current above a predetermined value.

3. In combination, a synchronous machine, means for regulating the excitation of said machine in response to the power factor and the magnitude of the armature current of said machine so as to increase the excitation of said machine when said armature current is below a predetermined value and also when said power factor is within a predetermined range and to decrease the excitation of said machine only when said armature current is above a predetermined value at the same time said power factor is outside said predetermined range, and means dependent upon the magnitude of the exciting current of said machine exceeding a predetermined value for effecting a decrease in the excitation of said machine and for rendering said power factor and armature current responsive means inoperative to increase the excitation of said machine.

4. In combination, a synchronous machine, means for regulating the excitation of said machine so as to maintain the armature current of said machine above a predetermined value and the power factor thereof at a predetermined value while said armature current is above a predetermined value, and exciting current responsive means for rendering said regulating means inoperative to vary the exciting current beyond a predetermined value.

5. In combination, a synchronous machine, means for regulating the excitation of said machine so as to maintain the armature current of said machine above a predetermined value and the power factor at a predetermined value while said armature current is above a predetermined value, and exciting current responsive means for rendering said regulating means inoperative to vary the exciting current beyond a predetermined value and operative to restore the exciting current to said predetermined value when it is varied beyond said predetermined value.

HERMAN BANY.